March 27, 1928.  
G. A. UNGAR  
1,664,052  
FLEXIBLE COUPLING  
Filed Jan. 9, 1925    6 Sheets-Sheet 1
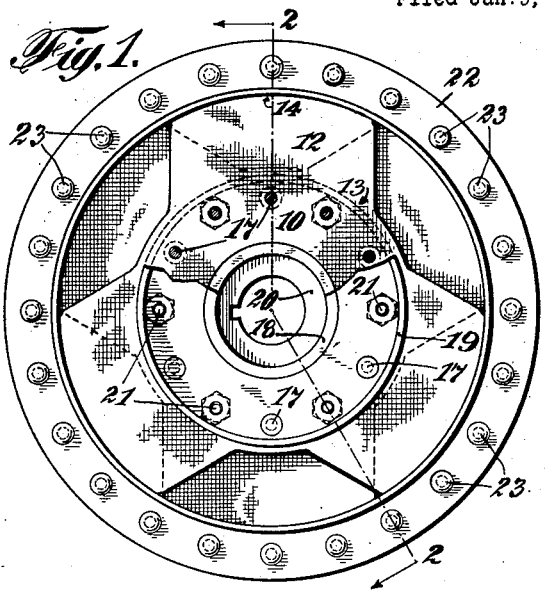
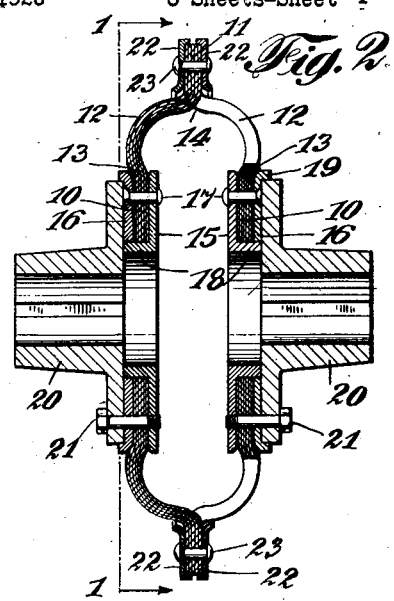
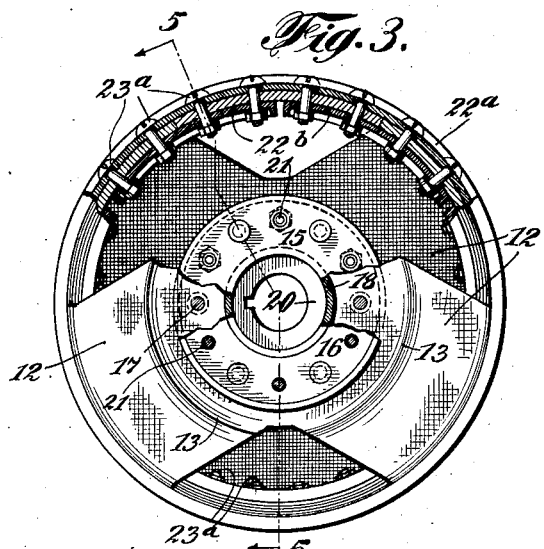
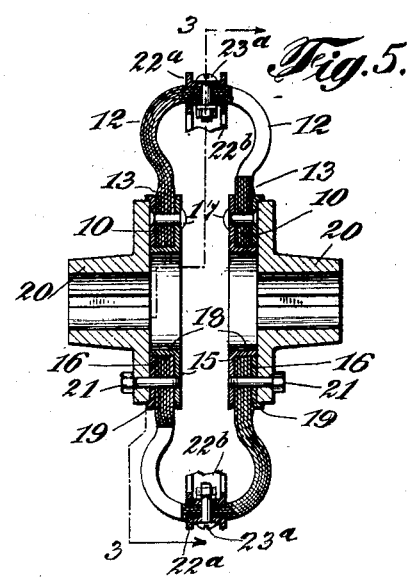
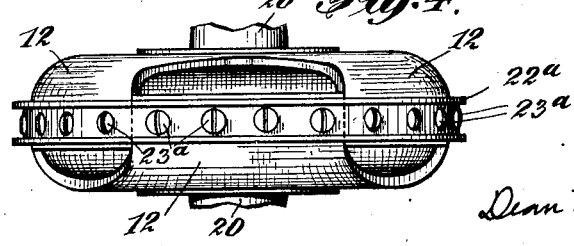
INVENTOR  
Gustave A. Ungar  
BY  
Dean Fairbank Obrecht & Hirsch  
his ATTORNEYS March 27, 1928. 1,664,052
G. A. UNGAR
FLEXIBLE COUPLING
Filed Jan. 9, 1925 6 Sheets-Sheet 2
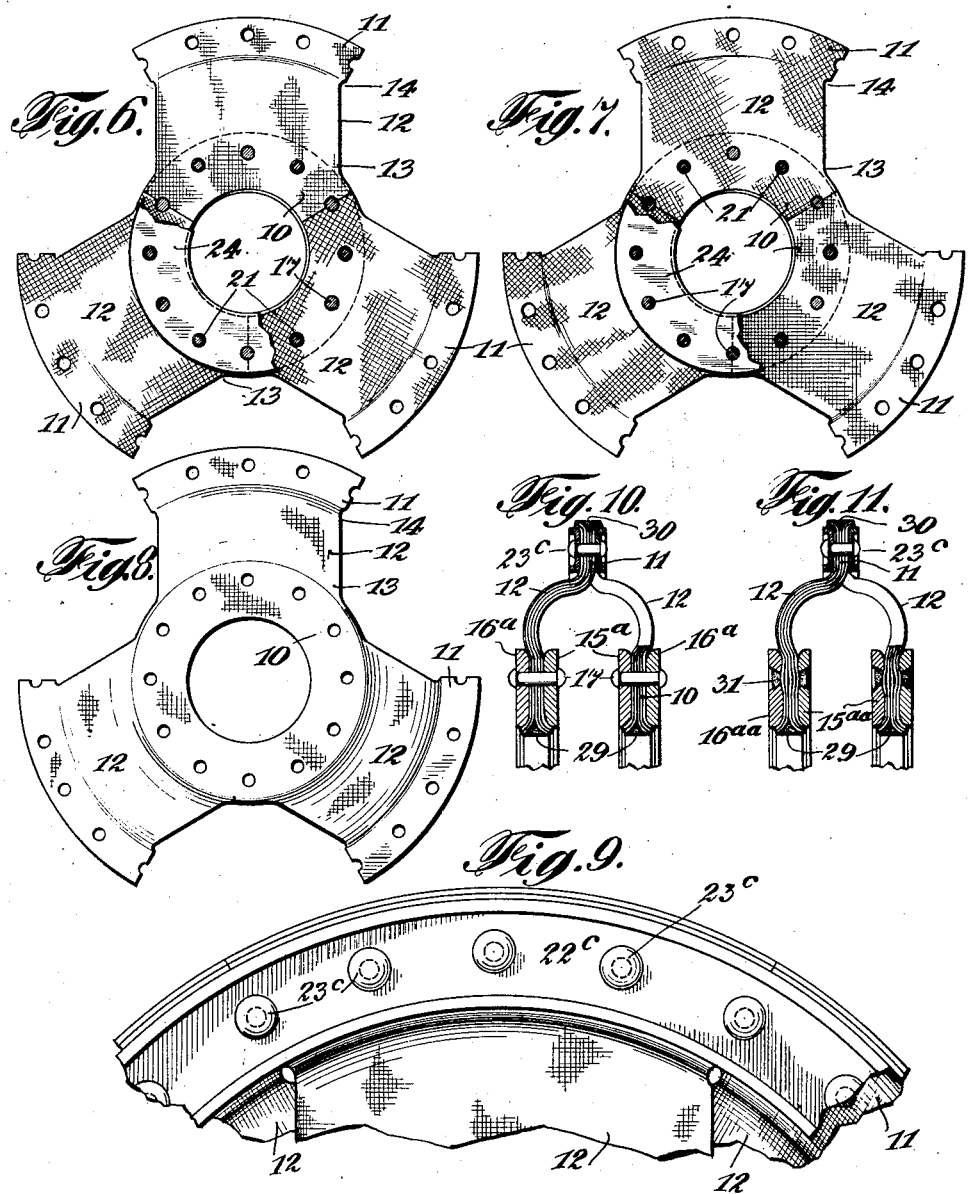
INVENTOR
Gustave A. Ungar
BY
his ATTORNEYS

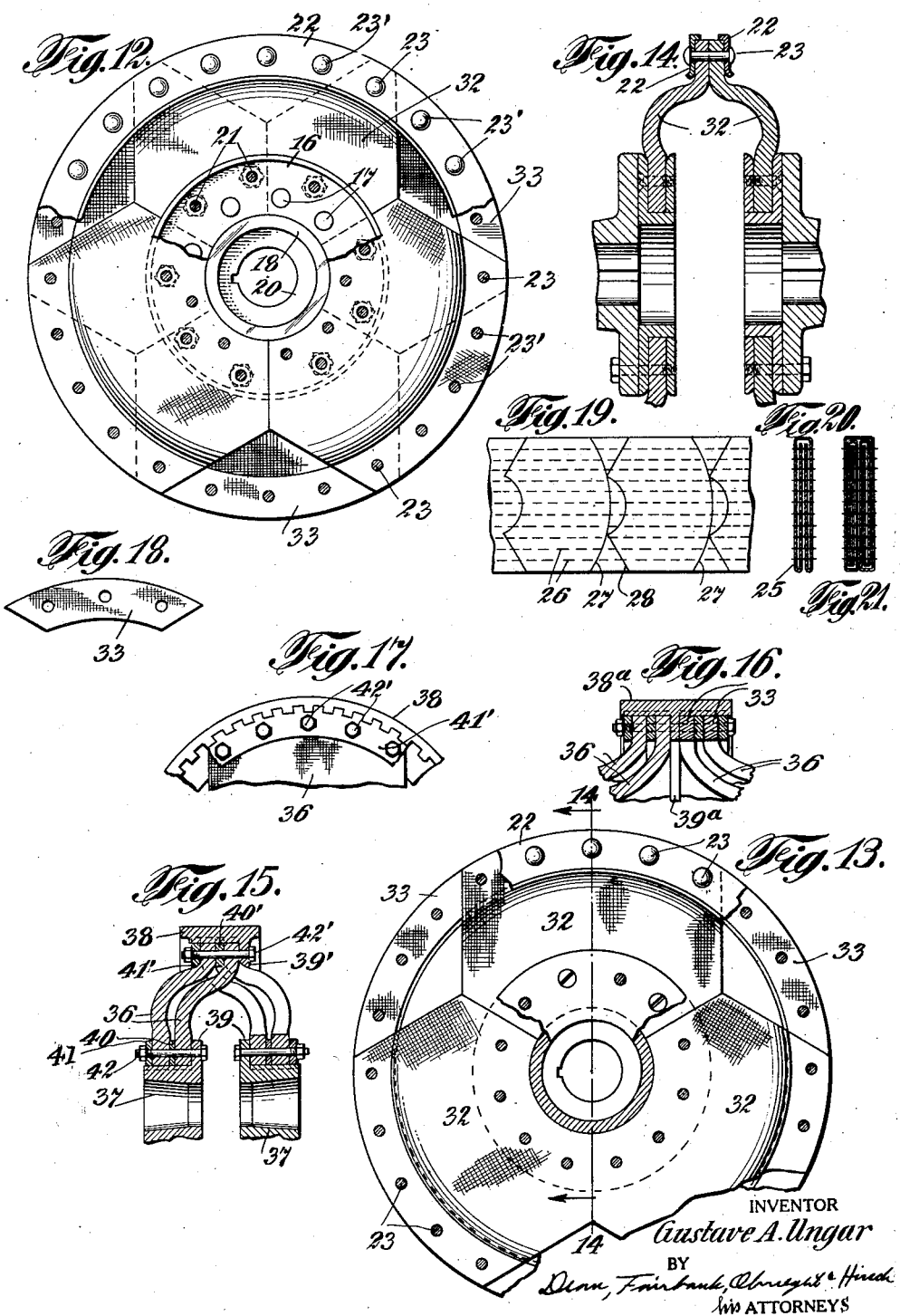

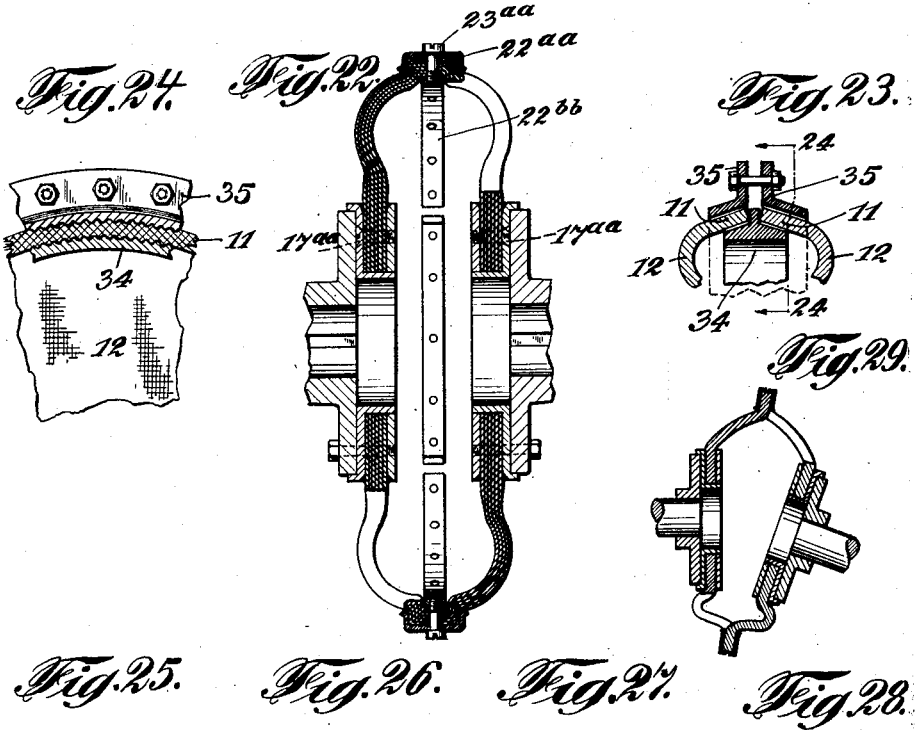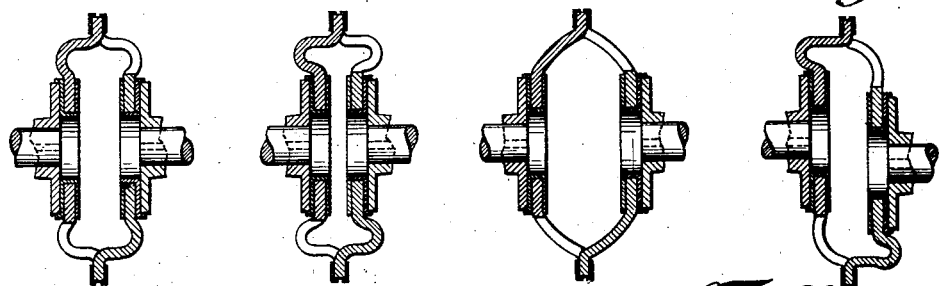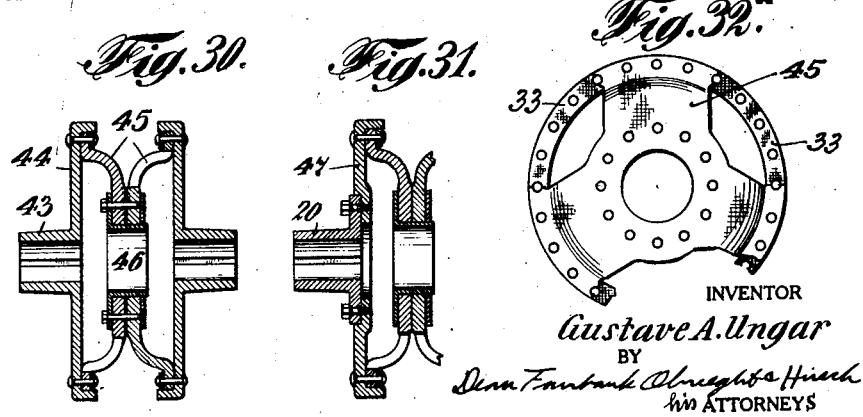

March 27, 1928.

G. A. UNGAR 1,664,052

FLEXIBLE COUPLING

Filed Jan.9, 1925

INVENTOR
Gustave A. Ungar
BY
his ATTORNEYS

March 27, 1928. 1,664,052
G. A. UNGAR
FLEXIBLE COUPLING
Filed Jan. 9, 1925 6 Sheets-Sheet 6
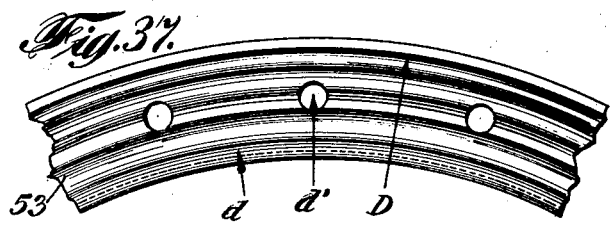
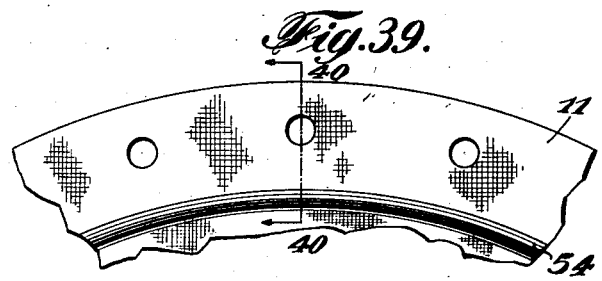
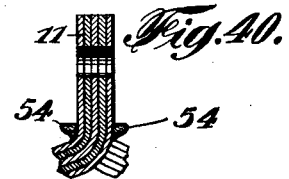
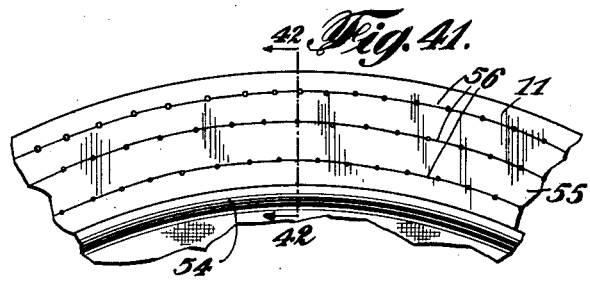
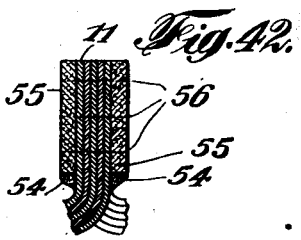
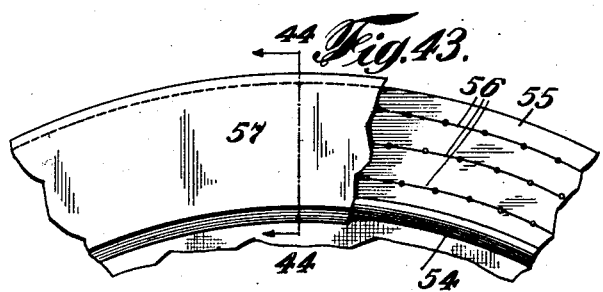
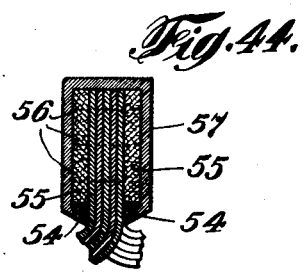
INVENTOR
Gustave A. Ungar
BY
his ATTORNEYS Patented Mar. 27, 1928.

1,664,052

UNITED STATES PATENT OFFICE.

GUSTAVE A. UNGAR, OF PELHAM MANOR, NEW YORK.

FLEXIBLE COUPLING.

Application filed January 9, 1925. Serial No. 1,350.

This invention is an improvement in that type of universal joint or coupling in which the transmission of torsional strains between rotatable driving and driven members is through flexible parts, whereby relative movements of said members are permitted, and the necessity of accurate positioning of the members and the use of surfaces moving in contact with each other with resultant friction, wear and need for frequent lubrication, are avoided.

Economy is effected in the manufacture of many machines, apparatus and the like, having rotatable driving and driven members, if it is permissible to eliminate the necessity for extremely accurate positioning of the axes of said members, and if one may use bearings or frame structures which are not necessarily so heavy and rigid as to hold the members against vibration or other forces tending to cause even a slight relative movement of the members at the coupling. Also, it is desirable that rotational variations such as slight accelerating and decelerating movements of one member be absorbed in the coupling without being transmitted to the other member.

The axes may be out of alignment due to an eccentric but parallel positioning or a slight angular positioning thereof, or both, and at the same time, or independently thereof, the rotatable members may have slight axial movement, and should be permitted to have slight cushioned relative rotational movement.

Many difficulties or defects have been encountered in devices of this type which have heretofore been employed. If the flexible parts be of metal, the continuous flexing during use causes fatigue in the metal, and eventual breaking. The parts should be designed to drive in one direction of rotation as well as another, but should permit a limited but yieldingly resisted back lash or relative rotation and limited relative radial and axial movements of the members. The flexible parts should not be radially, axially or torsionally rigid, but at the same time the parts should be held to the maximum degree against any change in position under the influence of centrifugal force at high rotational speeds. The force exerted on the flexible parts or any parts supported or carried thereby, should be so distributed and balanced that wobbling or irregular movement is resisted and the parts quickly find fixed centers of rotation at the usual driving speeds.

The main object of my invention is to secure the result above referred to by means of a construction which is simple in design, inexpensive to manufacture and assemble, efficient in operation, and durable in use.

As the most important feature of my invention I make the flexible parts of non-metallic flexible sheet-like material, preferably of multiple-ply fabric vulcanized together, and I so shape them that they have normal curvature both in a radial direction and in a circumferential direction. The radial curvature is such that radial rigidity is avoided because the curvature may vary to the necessary extent upon relative axial or radial movement of the driving and driven members, and may also vary during rotation if there be any lack of true alignment of the axes of said members. The flexible members each extend along a considerable arc circumferentially of the device, and are comparatively short radially, so that they have sufficient strength for the transmission of high power, but may bend to cushion or absorb shock in starting and stopping and prevent transmission of slight speed variations from one member to the other during operation.

The flexible parts have substantially stiff or rigid outer and inner annular sections, each of which may rotate at high speed about its own substantially fixed rotational center, due to the flexing of the intermediate portion, and the annular part which is flexibly supported may remain in a single plane without wobbling.

As a further feature I make the normal molded and vulcanized radial curvature a compound curve so that sharp angle bends are avoided in extreme flexure and the flattening of one curve part is accompanied by a flattening of the reverse curve.

As a further feature the thickness of the flexible member is made greater adjacent to the inner clamped part. Thus there is the greatest strength where the torsion strain is greatest, and also there is greater resistance to bending at a sharp angle at the edge of the clamped part.

As a further feature the coupling as manufactured for use or sale has the annular parts which are to be fastened to the driving and driven members, clamped between opposed metal surfaces which have effective surface gripping action and pressure thereon. Thus in installing the coupling it is merely necessary to bolt or otherwise secure these metal parts to the driving and driven members and the shear or driving pressure at the bolt holes of these metal parts is transmitted to the clamped surfaces of the flexible members.

As a further important feature the members are of spider form, that is, they include radially extending circumferentially spaced arms or sections capable of independent flexure. The spacing of the arms at the circumference may be substantially equal to the width of the several arms, whereby two members may be secured together at the periphery with the arms of one arranged alternately to those of the other, in a single plane, and the outer portions of all of the arms connected by a single rigid or stiff annular clamping or connecting member. The arms may be arranged in pairs with their outer edges in parallel planes or arranged in staggered but overlapped positions.

As a further feature the arms of the several flexible spider members are formed separately, the fabric in each being of multiple-ply, and so folded as to conceal and protect all cut or selvage edges of the fabric.

As a further important feature, particularly in couplings designed for the transmission of high power, each flexible member is formed of a plurality of axially spaced portions each of multiple-ply fabric, whereby internal stresses and fabric stretching are reduced to the minimum during flexing, and a multiplicity of gripping surfaces are presented.

Various other important features will be pointed out hereinafter or will be apparent from a consideration of the important advantages gained by the several different forms which my invention may assume, and which are hereinafter described and illustrated in the accompanying drawings. It is to be understood that these drawings are to be considered in an illustrative rather than in a limiting sense.

In these drawings:

Fig. 1 is an end view of a coupling embodying my invention, a small part being broken away and taken on the line 1—1 of Fig. 2.

Fig. 2 is a section on the line 2—2 of Fig. 1.

Fig. 3 is an end view partly in section on the line 3—3 of Fig. 5, and showing another form.

Fig. 4 is an edge view of the construction shown in Fig. 3.

Fig. 5 is a section on the line 5—5 of Fig. 3.

Figs. 6, 7 and 8 are face views of alternative constructions of flexible members.

Fig. 9 is a detail view of one form of outer clamping means.

Figs. 10 and 11 are longitudinal sections showing alternative means for anchoring the flexible members in the clamping means.

Figs. 12 and 13 are end views of further forms.

Fig. 14 is a section on the line 14—14 of Fig. 13.

Figs. 15 and 16 are longitudinal sections showing constructions embodying a plurality of flexible members axially spaced for large power units.

Fig. 17 is a face view of the clamping means employed in Figs. 16 and 17.

Fig. 18 is a face view of a spacer which may be employed in the construction shown in Figs. 12, 13, and 16.

Fig. 19 is a face view of a strip of multiple-ply stitched fabric from which the separate arms of the flexible members may be formed.

Figs. 20 and 21 are transverse sections showing different folded arrangements of the strip shown in Fig. 19.

Fig. 22 is a view similar to Fig. 5, but showing an alternative construction of peripheral annulus.

Fig. 23 is a sectional detail showing a still further form of peripheral annulus.

Fig. 24 is a section on the line 24—24 of Fig. 23.

Fig. 25 is a somewhat diagrammatic longitudinal section similar to Fig. 2, and showing the parts in aligned and normal positions.

Figs. 26 to 29 are views similar to Fig. 25, but showing the manner in which the flexible members bend to take care of varying relative positionings of the driving and driven members, the members being movable axially toward each other in Fig. 26, axially away from each other in Fig. 27, eccentrically and out of alignment in Fig. 28 and angularly in Fig. 29.

Figs. 30 and 31 are longitudinal sections showing an alternative assembling arrangement for the flexible members.

Fig. 32 is a face view of the flexible member and spacers which may be employed in Figs. 30 and 31.

Fig. 37 is a face view of one of the outer annuli showing a form of clamping surface which may be employed.

Fig. 38 is a sectional detail of a construction embodying the member shown in Fig. 37.

Fig. 39 is a face view of the outer portion of one of the members after vulcanizing, and before attachment to the metal annulus.

Fig. 40 is a section on the line 40—40 of Fig. 39.

Fig. 41 is a detail showing a stitching arrangement for connecting the flexible members at their outer edges.

Fig. 42 is a section on the line 42—42 of Fig. 41.

Fig. 43 is a detail showing a construction similar to that shown in Fig. 41, except with an outer stiffening or reinforcing casing.

Fig. 44 is a section on the line 44—44 of Fig. 43.

Fig. 45 is a face view of a portion of an inner clamping annulus which may be employed.

Fig. 46 is a section through a construction embodying the member shown in Fig. 45, the position of such section being indicated by the line 46—46 of Fig. 45.

Figure 33:
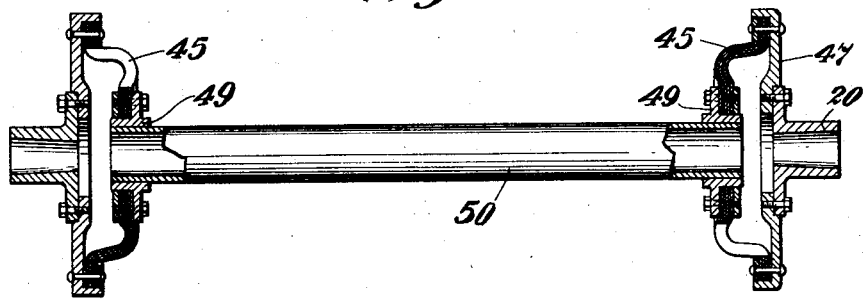
Fig. 33 is a central longitudinal section of a further form embodying my improved flexible member.

My improved flexible coupling includes three stiff or rigid annuli connected together in series by a pair of flexible members, said annuli being normally disposed coaxially in spaced parallel planes, the intermediate annulus being of different diameter from the other two which are of the same diameter. Thus there is formed an annular body with rigid inner and outer parts which may move in respect to each other, and of which parts the terminal ones may be secured to approximately coaxial driving and driven members for the transmission of torque therebetween. The flexible members are of non-metallic slightly elastic, sheet-like material, and of annular form. Although some compositions may be suitable for use in the manufacture of these flexible members, I preferably make each member of a plurality of layers or ply of rubberized fabric vulcanized together in molds so shaped as to give the desired normal curvature.

Referring particularly to Figs. 1 and 2, it will be seen that each flexible member has an inner stiff, rigid, or inflexible edge portion 10, an outer stiff, rigid or inflexible edge portion 11, and an intermediate curved flexible portion 12. The marginal or edge portions 10 and 11 may be connected to the intermediate flexible portion 12 by semi-flexible connecting portions 13 and 14. The inner edge portion 10 may include a larger number of fabric layers than does the flexible portion 12, and certain of these layers may extend out into the semi-flexible connecting portion 13 so that there is a gradual reduction in thickness and a stiffening or reinforcing of the portion 13 in respect to the part 12. This prevents sharp bending of the fabric at the outer edge of the inner portion 10, and also assists in the transmission of power as the torsional stresses are greater at the inner edge of the flexible member than they are at the outer edge.

The inner and outer edge portions 10 and 11 lie in different planes which may be parallel to each other and axially spaced, as shown in Fig. 2, or in other relationships as later pointed out and as illustrated particularly in Figs. 5 and 23. The inner edge portion is preferably permanently clamped or held in its rigid or inflexible position by a metal annulus which may include a pair of clamping rings 15 and 16 applied to opposite surfaces of the flexible member, secured together by rivets 17 or other connecting means to hold the flexible member under compression. One of these clamping rings may have an inner flange 18 for insuring proper centering in respect to the flexible member, and one of them may have an outer flange 19 for insuring proper centering in respect to a hub or collar 20 in connection with which the coupling may be employed, and which may serve for connecting the latter to a shaft. The clamping rings may be connected to the hub in any suitable manner, as for instance by screw bolts 21. As the inner edge of the flexible member is tightly clamped and under compression between the clamping rings, the torsional strains are transmitted from the hub 20 to the flexible member, or vice versa through the surface gripping of the flexible members without the flexible members exerting shearing strain on the clamping bolts, as will be more particularly pointed out hereinafter.

Two of the flexible members are employed and their outer edges are connected together and are held stiff and rigid by an outer annulus which preferably includes a pair of clamping rings 22 connected together by rivets, screw bolts, or other suitable means 23. The clamping rings hold the outer edges of the flexible members under compression, and therefore torsional strains are here also preferably transmitted by surface gripping of the members, rather than by shearing strains at the bolts or rivets.

The flexible portion 12 of each member normally presents a compound curve. That is, each portion of the member along a radial line is curved first in one direction and then in the other. Considering the member as shown in Fig. 2, and as viewed from the exterior, the semi-flexible portion 13 is concave, the intermediate or main flexible portion 12 is convex, while the other semi-flexible portion 14 is concave. By reason of the outward bending or curvature at the portion 13, the annular hollow body formed by the two members is of greater longitudinal dimension at a point within the flexible portion 12 than at the inner clamped portions 10—10. By reason of this compound curvature and rigid annular portion 11 between the two flexible portions 12—12, the driving and driven members which include or are connected to the hub 20 may occupy various different positions in respect to each other without interfering with the proper power transmission, and without setting up wobbling motion in the outer annular portion, and without materially stretching or excessively bending the flexible portions. The compound curvature permits eccentric positioning of the driving and driven members as shown in Fig. 28, which is not possible with the ordinary type of flexible disk coupling, and it permits angular displacement of the axes as shown in Fig. 29, or endwise displacement as shown in Figs. 26 and 27, without exerting any material stretching of the flexible member. As the outer annular portion is a stiff or rigid annulus, it assists in holding the main flexible portions against distortion under the strains of centrifugal force. As the outer edge portions of the flexible members are held by the outer annulus against strains tending to pull them out of a true circle, these outer parts will not wobble at low speeds, and will quickly find a fixed center of rotation upon acceleration to the normal speed for which the device is built.

As the flexible members are curved axially and radially, it will be obvious that they are also curved circumferentially, and this double curvature gives to the flexible members sufficient strength for the adequate transmission of torsional strains, but at the same time does not give rigidity against limited relative rotation. Thus slight acceleration and decelerating speed variations in either the driving or the driven member may be absorbed or cushioned without transmission to the other member.

As the torsional strain in the flexible member is greatest in the unclamped portion having the smallest radius and circumference, I make that portion of the member of complete or substantially complete circular form, and, as previously noted, preferably make it of greater thickness or stiffness than the remainder of the flexible portion. I have discovered that the outer edge of the unclamped portion may be made to extend through a very materially smaller circular arc than the inner edge, without reducing the strength or torsion-transmitting power. I have further discovered that I can make the flexible members of skeleton or spider form, with each arm of a width at its outer end approximately the same as the width at the inner end, thereby reducing weight, economizing material, reducing cost, facilitating cooling to remove heat generated in back and forth bending of the members, increasing the life of said members, facilitating molding of the members, facilitating assembly, and securing other results hereinafter referred to, without reducing the power-transmitting efficiency.

In Figs. 6, 7 and 8 I have shown a form which each flexible member may assume. It is this form which is illustrated as embodied in Figs. 1 and 2, hereinbefore described. The inner rigid portion 10 of the flexible member, may be an annular part, while the flexible portions and the outer rigid or clamped portion 11 are subdivided circumferentially into sections or the corresponding portions of radially extending arms. The ratio of outside diameter of the inner clamped portion to the inside diameter of the outer clamped portion may be such that the side edges of each arm may be substantially parallel and the arms may meet adjacent to the outer edge of the inner part 10, while the ends of each arm extend through approximately 60° of circular arc. In such a proportioning, the space between the outer ends of adjacent arms is equal to the width of each arm. This is of advantage in some constructions, as it permits two of the spider-shaped, dished disks to be assembled with the arms of one in alternating or staggered relationship to those of the other, and with the outer ends of the arms clamped in a single plane without spacers. This simplifies the construction and reduces the weight of the outer clamping and stiffening annulus.

In such a construction the outer end portions of the several arms have their edges radially disposed for a distance approximately equal to the width of the portion to be clamped by the outer annulus, so that upon assembling these edges will directly abut. In arranging the outer ends of the arms alternately in the same plane, it will be evident that I am not limited to a plane at right angles to the axis of the coupling, as shown in Figs. 1 and 2. The plane may be a cylindrical plane, as in Figs. 3, 4, 5 and 22.

In the constructions shown in these figures the terminal portions of each arm project axially rather than radially, and the reverse curve of the semi-flexible portion 14 of Figs. 1 and 2 is omitted. The construction does have a compound curve inasmuch as the portions 12 and 13 curve in opposite directions. Instead of using two similar continuous clamping rings 22, such as shown in Figs. 1 and 2, I employ a pair of concentric rings, one of which is preferably made up of sections. As shown, the outer edge portions of the arms of the flexible members are clamped between an outer ring 22$^a$ and an inner ring 22$^b$, by means of bolts 23$^a$. One of the rings as 22$^b$ may be made of sections.

The construction shown in Fig. 22 is similar in most respects to that shown in Fig. 5, except that increased gripping engagement of the clamping rings with the outer end portions of the arms is secured by providing the outer end portions of the arms with transverse grooves. The outer ring 22$^{aa}$ is provided with inturned flanges forming a groove, and the inner ring 22$^{bb}$ is very much narrower than the outer ring and engages in a groove in the arms. By this construction the liabilty of the arms pulling out of the clamping rings is reduced, and a firmer surface gripping effect is secured. The form shown in Fig. 22 is otherwise similar to that shown in Fig. 5, although it differs in certain minor details, such for instance as the use of screw bolts 23$^{aa}$ instead of bolts to receive nuts, and employs screws 17$^{aa}$ instead of the rivets 17 of Fig. 5.

In making up the flexible members I preferably employ, as previously noted, a plurality of layers of fabric vulcanized together. There are various ways in which these may be cut and assembled. In Fig. 8 I have shown a form of flexible member in which each main ply or layer of the fabric is of the full size and shape of the entire member, and thus the fabric forming the layers of each arm is integral with and formed as the same piece with the fabric forming all of the other arms. In addition to the main layers, there may be annular supplemental layers to stiffen or increase the thickness of the inner clamped portion 10, and possibly a part of the semi-flexible portion 13. The fabric employed is preferably of the same general type as that employed in making automobile tire casings, namely rubberized canvas. The several layers when assembled are pressed together and vulcanized by the application of the proper heat, while the pressure is maintained. A larger number of ply may be employed in the part 10 without increasing the thickness, due to the increased pressure exerted, resulting in squeezing out some of the rubber. The several layers may be so cut that the warp and woof threads of each layer extend in a different direction from those of any other layer, whereby uniformity in resisting stretching action is secured. A fabric may be especially woven for use in making the layers, and may have one set of threads extending radially and the other set extending in concentric circles or spirally.

In Fig. 6 I have shown a flexible member of the same shape as that shown in Fig. 7, but the main layers of each arm are cut separately and are assembled in the proper relative positions in the mold before vulcanizing. Annular reinforcing layers 24 may be placed beneath, upon, or between the main layers of each arm and vulcanized thereto, so that in the finished member all of the arms will be permanently connected. By making the arms separately instead of from a single piece, the layers may be so cut as to make the direction of the threads the same in all of the arms. In Fig. 6 I have indicated the threads along the center line of each arm extending radially. Thus the threads in no two arms are in alignment or at right angles to each other. It will of course be evident that here also all of the layers of any one arm need not have the same direction of warp and woof threads.

In Fig. 7 I have indicated the threads adjacent to the edges of the inner end of the flexible portion extending substantially tangentially to the outer circumference of the inner clamped portion. Thus torsional strains due to the application of power to the inner clamped portion will be essentially in the direction of the length of the threads in the flexible portions. This gives greater strength and less stretch or relative rotational movement of the driving and driven parts. Here as in Fig. 6 the main layers forming the several arms may be connected together by annular fabric rings 24 vulcanized thereto.

To avoid the exposing of cut edges of the fabric along the edges of the arms which might result in fraying or slight ravelling, I may and preferably do make the several layers of each arm from a single sheet of fabric so folded as to protect and conceal the edges. I have indicated somewhat diagrammatically such an arrangement in Figs. 19, 20 and 21. A single sheet 25 of fabric is selected or cut of such width that when folded it will give the desired number of thicknesses, each of a width equal to the desired width of the arm. In folding, care should be taken to bring the free edges within the fold.

As shown in Fig. 20 the sheet is folded to give four ply, while in Fig. 21 a sheet of approximately twice the width is folded to give eight ply. The several ply or layers are stitched together by longtudinal lines of stitching 26, and cut on transverse lines 27 and 28 to give sections of such shape that when bent to the desired curvature and vulcanized in the mold, they will form arms of the proper and desired dimensions.

The holes for rivets or bolts in the flexible members may be formed in various different ways. They may be cut in each ply before the layers are assembled and vulcanized in the mold, in which case the mold is preferably provided with pins to receive these holes. The holes might be punched after the vulcanizing operation has been completed. In some constructions it is preferable that the holes be formed without the actual cutting of any of the threads of the fabric. The mold then may be provided with comparatively sharp pointed pins, whereby the layers of the fabric, as they are placed in the mold or as the mold is closed up, will be pierced by these pins which will push aside the threads to form the desired holes. This has the advantage in that the fabric is not weakened by the cutting of any of the threads and the fabric is stiffened or reinforced around the holes by the compacting of the threads as they are pushed aside by the pins.

In molding the flexible members the inner and outer edges may be made of materially increased thickness to preclude the possibility of the edge portions drawing out of the clamping rings. In Fig. 10 I have shown a construction in which the several ply going to make up each flexible member are separated at their inner edge to receive a rubber or other wedging ring 29 which is vulcanized in place, and the same is done with the outer edges to receive a similar ring or strip 30. These act as spreaders and increase the effective thickness so that better gripping action is secured. The inner clamping rings may be vulcanized directly to the fabric instead of being applied after the vulcanizing. In Fig. 10 I have shown a construction in which the clamping rings 15ª and 16ª are of such form that they may be riveted to the fabric before vulcanizing, and then vulcanized directly thereto or applied and riveted after vulcanization. In some cases the vulcanizing may be sufficient to permanently attach the clamping rings to the flexible members. This is particularly true if the clamping members be so formed as to permit the desired anchorage.

In Fig. 11 I have shown clamping rings 16ᵃᵃ and 15ᵃᵃ with countersunk openings therethrough which may receive rubber plugs 31 which will be vulcanized to the canvas and thus hold all the parts together. After the two separate flexible members have been made and vulcanized they may have the outer or spreading rubber ring vulcanized thereto after the members have been clamped between the rings 22ᶜ which are held together by rivets 23ᶜ.

As shown particularly in Fig. 9, the flexible members may extend out radially beyond the clamping rings so that the thickened outer edge makes a permanent anchorage against any longitudinal pull on the arms.

In making the flexible members of spider form it is not essential that the outer ends of the arms be of a width equal to the space between adjacent arms. The arms may be wider than the spaces. In such arrangement it is not convenient to bring the outer ends of all the arms into a single plane, and as it is more convenient to place them in parallel planes it ceases to be material whether the arms are in staggered arrangement or in parallel pairs.

In Fig. 12 I have shown a form which is quite similar to the construction shown in Fig. 1, except that the flexible arms 32 are wider than the arms shown in Fig. 1. Thus they overlap as indicated in dotted lines and certain of the rivets 23 extend through the outer ends of two arms, while other rivets 23′ extend through only a single arm. In connection with this form there are employed spacers 33 such as shown in Fig. 18, and which brace one arm in respect to the other circumferentially and hold the clamping rings at uniform distances.

Instead of having the arms staggered as in Fig. 12, they may be arranged parallel as in Figs. 13 and 14. Fig. 13 involves the same identical parts as in Fig. 12, but constitutes a different assembly. In Fig. 13 the two spacers 33 come opposite to each other or a spacer of double thickness is employed. In building up couplings of this character I preferably employ the folded multiple ply construction of arms as indicated in Figs. 19, 20 and 21.

If the outer ends of the arms are not of such width as will permit bringing them into the same plane with the ends of the arms of the adjacent member, then it is not essential that these outer ends lie in parallel planes. Various different forms of coupling rings may be employed. As shown in Figs. 23 and 24, I may employ an inner ring 34 having its outer surface presenting oppositely inclined gripping portions and adapted for cooperation with a pair of rings 35 which also present inclined surfaces and which may be brought together to clamp the arm ends 11 rigid in respect to each other. By providing the gripping surfaces of the rings 34 and 35 with corrugations or other surface irregularities, the desired and effective locking of the flexible members is secured. It will be noted that this construction has an advantage in that it is not necessary to provide the flexible member with rivet or bolt holes.

For the transmission of high power where larger cross-section of flexible member is necessary, I avoid the stiffness and rigidity which would result from increasing the number of ply by using a larger number of the flexible members of satisfactory design.

In Figs. 15 and 16 I have shown constructions in which a plurality of flexible members are employed between the centrally disposed annulus and the two annuli which are connected to the driving and driven members.

In the construction shown in Fig. 15 two separate flexible members 36 have their inner edges connected in spaced relationship to an inner annulus 37, while the outer ends of the two flexible members of the two annuli 36 are clamped to the outer or intermediate annulus 38 also in spaced relationship. For avoiding shearing strains at the bolt holes, and for spacing the flexible members each annulus 37 is provided with a flange 39 and a series of longitudinally extending teeth on the cylindrical surface at the side of the flange. A spacer 40 and a separate clamping ring 41 have coacting teeth so that relative rotation of the members 40 and 41 in respect to the member 37 is prevented. Thus the bolts 42 which connect the flange 39, the spacer 40, the clamping ring 41, and the two flexible members, do not have to resist torsional strains and act merely to clamp the parts in an axial direction. The outer annulus 38 may be similarly constructed. The body portion thereof may have a flange 39', a spacer 40' and a clamping ring 41' through which extend the bolts 42'.

In Fig. 15 I have shown the arms of each flexible member connected to one annulus 37 arranged in the same planes with and alternating with the arms of the flexible members secured to the other annulus 37. If the arms be too wide for this arrangement, they may be all disposed in separate planes as indicated in Fig. 16, where the annulus $38^a$ has its flange $39^a$ intermediate of its ends rather than upon one end, and there are two of the spacers and two of the clamping rings. Obviously the arrangement shown in Fig. 16 requires the use of spacers such as that shown in Fig. 18. The use of two or three flexible members instead of a single member of two or three times the thickness has a further advantage in that it presents an increased number and area of gripping surfaces for the flexible members.

In all of the forms hereinbefore described I have so assembled the parts that the intermediate annulus is of larger diameter than the two terminal annuli. This is preferably in most constructions as the smaller annuli may be more conveniently connected to the driving and driven members. It is not essential so far as concerns many important features of my invention, as the parts may be assembled as shown in Figs. 30, 31 and 32. Here the hubs 43 which are connected to the driving and driven members have larger diameter flanges 44, the outer edges of which are clamped to the outer edges of the two flexible members 45. The inner edges of the two flexible members are directly clamped together by a collar 46 having a flange and clamping collar for rivets or bolts. The flange 44 may be integral with the hub 43 as shown in Fig. 30, or there may be a clamping ring 47 of such width that it may be directly secured to a hub 20, such as that shown in Fig. 2.

Figure 34:
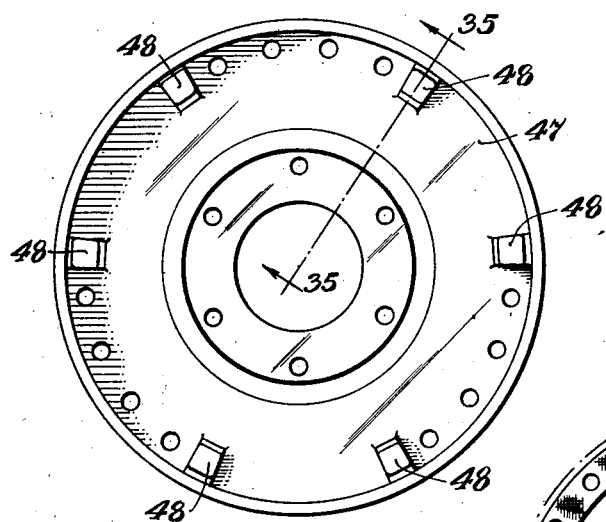
Fig. 34 is a face view on a larger scale, of one of the connecting flanges shown in Fig. 33.
Figure 35:
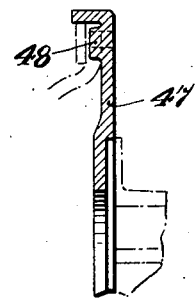
Fig. 35 is a section on the line 35—35 of Fig. 34.

If the flexible members be of spider form their outer ends may be arranged alternately as shown in Fig. 30, or they may be arranged in pairs as shown in Fig. 31. Their outer ends may be spaced by spacers 33 as indicated in Fig. 32 or the members 44 or 47 may have lugs 48, the same as shown in Figs. 34 and 35, or may have pockets to receive the outer ends of the arms and hold them against any relative circumferential movement.

It will be obvious that such an arrangement as shown in Figs. 30 and 31, the length of the collar 46 is not material and that the inner ends of the flexible members may be clamped in spaced relationship.

Figure 36:
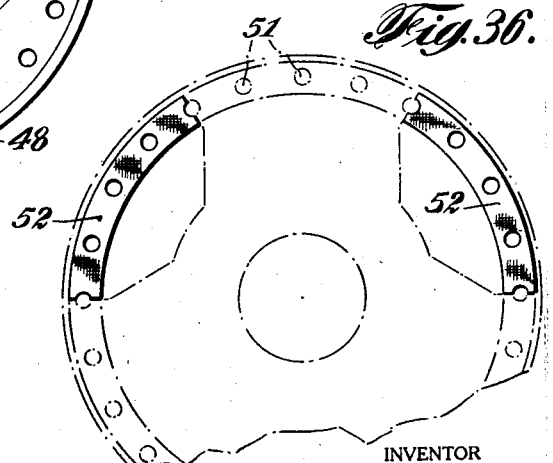
Fig. 36 is a view similar to Fig. 34 but showing an alternative arrangement of spacing means.

In Fig. 33 I have shown a construction in which there are employed hubs 20 and clamping members 47 substantially the same as in Fig. 31, but two separate pairs of clamping members 49 are employed for the inner edges of the two flexible members 45, and these two clamping members 49 are spaced apart and separately connected to an intermediate shaft 50. If the flexible members be secured between the lugs 48 on the members 47, as shown in Figs. 34 and 35, it will be apparent that it is not necessary to provide bolt holes except in each alternate space. It will also be apparent that it is not possible to change the assembly with such an arrangement as is possible if there be a uniform row of bolt holes 51, as shown in Fig. 36, and spacers 52 be employed in place of the lugs 48.

The clamping rings for both the inner and outer edges of the flexible members should have ample radius where the flexible material emerges so as to give gradual pressure release. Furthermore the clamping rings or other parts should be so firmly compressed against the flexible material or so designed that substantially the entire transmission of torsional strains between the flexible members and the clamping rings is by surface contact. It is also desirable that the rivet or bolt holes through the clamping rings be so positioned radially that the amount of material outside of or beyond the row of bolt or rivet holes is substantially equal to that within or encircled by the row of holes. In other words, the row of holes should be slightly nearer to the outer edge of the clamping surface than to the inner edge.

In Fig. 37 I have shown details of a clamping construction in which the clamping ring 53 has a series of circumferential currugations in its operating face, so that when two of these rings are forced against the opposed surfaces of the flexible material they impress corresponding corrugations in said material and give the desired gripping action.

In Fig. 37 I have shown an arrow $d$ indicating the inner diameter of the clamping face, an arrow $D$ indicating the outer diameter of the clamping face and an arrow $d'$ indicating the diameter of the center line of the rivet or bolt holes. The diameter $d'$ should be such in respect to the diameters $d$ and D, that the area of the annular strip between the circles having diameters $d$ and $d'$, and the area of the annular strip between the circles having the diameters $d'$ and D will be equal. Thus the row of rivets or bolts will be midway between two clamped portions of equal area.

In some constructions it may be desirable to vulcanize the outer edges of the two flexible members together and in such a construction there may be vulcanized to said members a pair of ridges or flanges 54 as shown in Figs. 39 and 40, which will engage with the inner edge of the clamping rings and prevent moisture from seeping into the fabric between said clamping rings. These ridges or flanges may be comparatively soft so that they can give during bending of the flexible members and at the same time aid in rendering portions of the latter only semi-flexible as compared to the main portion 12.

In some constructions it may be possible to eliminate the outer clamping rings and so connect and stiffen the flexible members themselves as to form a rigid outer annulus. In Figs. 41 and 42 I have shown a construction in which the outer edge portions of the flexible members are placed between a pair of annular fabric strips 55 which are connected to the outer portions 11 by lines of stitching 56, and sealed at the inner edge by rubber ridges or flanges 54, the same as shown in Figs. 39 and 40. Preferably such a construction as shown in Figs 41 and 42 is encased in an outer shell which aids in giving the desired stiffness.

In Figs. 43 and 44, I have shown a construction substantially the same as that shown in Figs. 41 and 42 with an outer casing or shell 57, enclosing the outer edge portions of the flexible members. This may be of comparatively hard, stiff, vulcanized rubber or rubber composition.

In Figs. 37 and 38 the clamping ring construction is that intended for the outer edges of the flexible members. It will be obvious that the same relative positioning of the row of holes in respect to the edges of the clamped surface and the same surface corrugation should be employed for the clamping rings for the inner edges of the flexible members.

In Figs. 45 and 46 I have shown such clamping rings 58 with corrugations 59 but have shown the corrugations flatter and fewer in number. It will of course be understood that so far as concerns the detail of the clamping members in Figs. 1 to 5, 9 to 14, and 30 to 36, these parts are somewhat diagrammatically illustrated and that in any of these constructions there might and preferably would be employed certain of the details illustrated in Figs. 37 to 46 inclusive.

Having thus described my invention, what I claim as new and desire to secure by Letters Patent is:—

1. A torque-transmitting flexible element for couplings, said element being formed of a plurality of layers of fabric vulcanized together, and having outer and inner edge portions spaced axially, and an intermediate flexible continuously curved connecting portion, said inner edge portion having means secured thereto for holding the same stiff and rigid.

2. A torque-transmitting flexible element for couplings, said element being formed of a plurality of layers of fabric vulcanized together, and having outer and inner edge portions spaced axially, and an intermediate flexible continuously curved connecting portion, said inner edge portion having a pair of clamping rings secured thereto and holding said last mentioned portion under pressure.

3. A torque-transmitting flexible element for couplings, said element being formed of a plurality of layers of fabric vulcanized together, and having outer and inner edge portions spaced axially, and an intermediate flexible continuously curved connecting portion, said inner edge portion having a pair of clamping rings upon opposite sides thereof, and riveted together through said edge portion to hold the latter stiff and rigid and to provide means for attaching said element to a driving or driven part.

4. A torque-transmitting flexible element for couplings, comprising a spider formed of a plurality of layers of fabric vulcanized together.

5. A torque-transmitting flexible element for couplings, having an annular central portion and a series of radially extending arms, each formed of a plurality of layers of fabric vulcanized together.

6. A torque-transmitting flexible element including a plurality of circumferentially spaced, radially extending, axially curved flexible arms formed of a plurality of layers of fabric vulcanized together.

7. A torque-transmitting flexible coupling including a pair of annular elements, each formed of a plurality of layers of fabric vulcanized together and each having outer and inner edge portions, a pair of clamping rings engaging the inner edge portion of one of said elements and adapted to be secured to a driving member, a pair of clamping rings engaging with the inner edge portion of the other element and adapted to be secured to a driven member, and a pair of clamping rings connecting together the outer edge portions of said elements.

8. A torque-transmitting flexible coupling including a pair of elements each of spider form, and having an inner annular portion and a plurality of outwardly extending arms, each of said elements being formed of a plurality of layers of fabric connected together by frictioning material, and a pair of clamping rings connecting the outer ends of all of said arms and holding them stiff and rigid in respect to each other.

9. A torque-transmitting flexible coupling, including a pair of elements each of spider form, and having an inner annular portion and a plurality of outwardly extending arms, each of said elements being formed of a plurality of layers of fabric connected together by frictioning material, and a pair of clamping rings connecting the outer ends of all of said arms and holding them stiff and rigid in respect to each other, the intermediate portions of said arms being flexible, and said inner annular portions being axially spaced.

10. A torque-transmitting flexible coupling including a driving member, a driven member, and a flexible disk formed of a plurality of layers of fabric secured together and having the peripheral portion offset from the plane of the central portion, one of said members being secured to said central portion, and the other of said members being secured to the peripheral portion, said disk having the peripheral portion subdivided into peripherally spaced sections whereby radial, axial, or tilting movement of one of said members in respect to the other is permitted.

11. A torque-transmitting flexible coupling including a disk having a plurality of radially projecting sections made up of a plurality of layers of fabric pressed and vulcanized with the outer ends axially offset in respect to the inner ends and the intermediate portions continuously curved.

12. A torque-transmitting flexible coupling including a plurality of elements each formed of a plurality of layers of fabric connected together by frictioning material, and each having a series of radially extending arms, means for connecting the outer ends of the arms of one element to the outer ends of the arms of the other element, said means including circumferentially extending spacers between the opposed edges of the outer ends of the arms of each element.

13. A flexible coupling including a driving member, a driven member approximately in axial alignment therewith and spaced therefrom, an intermediate stiff and rigid annulus, a pair of flexible fabric dished disks connecting said intermediate annulus with said driving and driven members respectively.

14. A torque-transmitting flexible coupling including a pair of annular diaphragm members, a driving member, a driven member, means for connecting together the two corresponding edges of the two diaphragm members and holding said edges inflexible, and means for securing the other edges of said diaphragm members to the driving and driven members respectively, each of said diaphragm members having an intermediate flexible portion curved axially of the coupling, and portions connecting said flexible portion to the edge portions, and of less flexibility.

15. A torque-transmitting flexible coupling including a pair of annular diaphragm members, a driving member, a driven member, means for connecting together the two corresponding edges of the two diaphragm members and holding said edges inflexible, and means for securing the other edges of said diaphragm members to the driving and driven members respectively, each of said diaphragm members having an intermediate flexible portion curved axially of the coupling, and portions connecting said flexible portion to the edge portions, and of less flexibility, the flexible portion being curved in one direction, and the two less flexible portions being curved in the opposite direction.

16. A torque-transmitting flexible coupling having a diaphragm or sheet-like element including an inflexible outer portion, an inflexible inner annular portion, an intermediate flexible portion, and two portions connecting said flexible portion to said inflexible portions, and of less flexibility than said flexible portion, said flexible portion being curved in one direction and said third mentioned portions being curved in the opposite direction.

17. A torque transmitting flexible element for couplings, the said element being formed of a plurality of layers of fabric vulcanized together and having radially spaced inner and outer concentric portions, one adapted to be rigidly clamped to a torsion delivering element and the other adapted to be rigidly clamped to a torsion receiving element, and an annular intermediate torsion transmitting portion extending continuously inwardly from said outer to said inner portion, the outside diameter of said inner portion being approximately one-half the outside diameter of said outer portion.

18. A flexible power transmitting element including a disk-like body, having a pair of concentric radially spaced portions, one adapted to be rigidly clamped to a driving member and the other to be rigidly clamped to a driven member, and an annular flexible intermediate torsion or power transmitting portion extending continuously inwardly from the inner edge of the outer portion to the outer edge of the inner portion, said outer and inner portions being offset axially and said element being formed of a plurality of layers of fabric vulcanized together.

19. A torque transmitting flexible element for couplings, said element being formed of a plurality of layers of fabric vulcanized together and having radially spaced inner and outer concentric portions, one adapted to be rigidly clamped to a torsion delivering element, and the other adapted to be rigidly clamped to a torsion receiving element, and an annular intermediate torsion transmitting portion extending continuously inwardly from said outer to said inner portion, said intermediate portion being free to flex and including an outer section extending inwardly from said outer portion, and curving axially, a main section extending inwardly from said outer section, and curving in the reverse direction, and an inner section extending inwardly from the main section to said inner portion, and reversely curved, whereby said main section bulges axially beyond said inner portion.

20. A torque transmitting flexible element for couplings, said element being formed of a plurality of layers of fabric vulcanized together and having radially spaced inner and outer concentric portions, one adapted to be rigidly clamped to a torsion delivering element, and the other adapted to be rigidly clamped to a torsion receiving element, and an annular intermediate torsion transmitting portion extending continuously inwardly from said outer to said inner portion, said intermediate portion being flexible and continuously curved inwardly from said outer portion to said inner portion, the outside diameter of said inner portion being approximately one-half the outside diameter of said outer portion.

21. A torque transmitting flexible element for couplings, said element being formed of a plurality of layers of fabric vulcanized together and having radially spaced inner and outer concentric portions, one adapted to be rigidly clamped to a torsion delivering element, and the other adapted to be rigidly clamped to a torsion receiving element, and an annular intermediate torsion transmitting portion extending continuously inwardly from said outer to said inner portion, said intermediate portion including a main section, the radial components of which continuously curve in a single direction, and two narrower sections curved reversely to the curvature of the main section, and connecting said main section to said inner and outer portions.

22. A torque transmitting flexible element for couplings, said element being formed of a plurality of layers of fabric vulcanized together and having radially and axially spaced inner and outer concentric portions, one adapted to be rigidly clamped to a torsion delivering element, and the other adapted to be rigidly clamped to a torsion receiving element, and an annular intermediate torsion transmitting portion extending continuously inwardly from said outer to said inner portion, said intermediate portion being free to flex and including an outer section extending inwardly from said outer portion, and curving axially, a main section extending inwardly from said outer section, and curving in the reverse direction, and an inner section extending inwardly from the main section to said inner portion, and reversely curved, whereby said main section bulges axially beyond said inner portion, the extent of the axial spacing being less than the amount of the radial spacing, and said intermediate portion curving continuously inwardly from the inner edge of the outer portion to the outer edge of the inner portion.

Signed at New York, in the county of New York and State of New York, this 6th day of January A. D. 1925.

GUSTAVE A. UNGAR.